United States Patent
Ohmori et al.

(10) Patent No.: US 11,755,980 B2
(45) Date of Patent: Sep. 12, 2023

(54) SKILL INDEX CALCULATION APPARATUS, ANNOTATION PROVIDING APPARATUS, SKILL INDEX CALCULATION METHOD, ANNOTATION PROVIDING METHOD AND PROGRAM

(71) Applicant: NIPPON TELEGRAPH AND TELEPHONE CORPORATION, Tokyo (JP)

(72) Inventors: Kumiko Ohmori, Tokyo (JP); Yuki Shiroma, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/286,791

(22) PCT Filed: Oct. 23, 2019

(86) PCT No.: PCT/JP2019/041524
§ 371 (c)(1),
(2) Date: Apr. 19, 2021

(87) PCT Pub. No.: WO2020/085379
PCT Pub. Date: Apr. 30, 2020

(65) Prior Publication Data
US 2021/0357844 A1   Nov. 18, 2021

(30) Foreign Application Priority Data
Oct. 24, 2018 (JP) .................................. 2018-200331

(51) Int. Cl.
*G06Q 10/00* (2023.01)
*G06Q 10/0639* (2023.01)
(Continued)

(52) U.S. Cl.
CPC ......... *G06Q 10/06398* (2013.01); *G09B 5/02* (2013.01); *G09B 19/00* (2013.01); *H04L 63/0428* (2013.01)

(58) Field of Classification Search
CPC ............. G06Q 10/063; G06Q 10/0639; G06Q 10/06398; G06Q 10/06395; G06Q 10/06393
See application file for complete search history.

(56) References Cited

U.S. PATENT DOCUMENTS 7,133,834 B1 * 11/2006 Abelow ............. G06Q 30/0245
705/1.1
2008/0244402 A1   10/2008 Sakakibara et al.
(Continued)

FOREIGN PATENT DOCUMENTS

JP   H08-055103 A   2/1996
JP   2003-015798 A   1/2003
(Continued)

OTHER PUBLICATIONS

Kelly, B. (2005). Performance optimization solutions for better efficiency and productivity. Customer Inter@ction Solutions, 24(2), 58-60. (Year: 2005).*
(Continued)

*Primary Examiner* — William S Brockington, III (57) ABSTRACT

An operational efficiency promoting apparatus that calculates a skill index indicating a skill level related to an operation of a user, based on an operation log of the user on an operation terminal, the operational efficiency promoting apparatus includes a memory; and a processor configured to execute storing the operation log obtained from the operation terminal in the memory; and—calculating the skill index corresponding to each of a plurality of factors based on the operation log read from the memory.

14 Claims, 3 Drawing Sheets

(51) Int. Cl.
  *G09B 5/02*     (2006.01)
  *G09B 19/00*    (2006.01)
  *H04L 9/40*     (2022.01)

(56)           References Cited

U.S. PATENT DOCUMENTS

2014/0058801 A1*   2/2014   Deodhar ............ G06Q 10/0639
                                                       705/7.38
2015/0195406 A1*   7/2015   Dwyer .................. G06F 40/279
                                                     379/265.07
2015/0356489 A1*  12/2015   Kazai ............... G06Q 10/06398
                                                       705/7.42
2018/0060831 A1*   3/2018   Swift ............. G06Q 10/063114
2019/0058793 A1*   2/2019   Konig ................. H04M 3/5183

FOREIGN PATENT DOCUMENTS

JP        2003-345487 A    12/2003
JP        20080257345 A    10/2008
JP        2014-232377 A    12/2014

OTHER PUBLICATIONS

Japanese Patent Application No. 2020-553430, Office Action dated Nov. 1, 2022, 5 pages with English Translation.

\* cited by examiner

FIG.1

SKILL INDEX CALCULATION APPARATUS, ANNOTATION PROVIDING APPARATUS, SKILL INDEX CALCULATION METHOD, ANNOTATION PROVIDING METHOD AND PROGRAM

CROSS-REFERENCE TO RELATED APPLICATIONS

This application is a U.S. 371 Application of International Patent Application No. PCT/JP2019/041524, filed on 23 Oct. 2019, which application claims priority to and the benefit of JP Application No. 2018-200331, filed on 24 Oct. 2018, the disclosures of which are hereby incorporated herein by reference in their entireties.

TECHNICAL FIELD

The present invention relates to techniques for a user to perform operations on a user operation interface displayed on an operation terminal.

BACKGROUND ART

Conventional techniques related to a user operation interface that displays information for a user performing input/output operations using a computer or the like include, for example, techniques disclosed in Patent Document 1 and techniques disclosed in Patent Document 2.

Patent Document 1 discloses a technique of determining the learning level of a user on a user operation interface by objectively determining the skill level of the user by time intervals of key operations. Also, Patent Document 2 discloses a method of providing an appropriate interface by switching operation mask information depending on the operation level of a user.

RELATED ART DOCUMENTS

Patent Documents

[Patent Document 1] Japanese Laid-Open Patent Application No. H08-55103
[Patent Document 2] Japanese Laid-Open Patent Application No. 2003-15798

SUMMARY OF INVENTION

Problem to be Solved by the Invention

When a user learns input/output operations, the learning requires time and education by veteran personnel, and even experts are at risk of incidents due to input errors. Also, due to the demand for promoting operational efficiency, users are required to perform quick and precise input/output operations.

In Patent Documents 1 and 2 described above, knowledge with respect to operators is obtained from operation logs. In other words, in Patent Document 1, the skill level is determined by time intervals of key operations. Also, in Patent Document 2, the operation level of an operator is measured by a comparison result between key input contents and a list of operable keys, and the pace and stability of key inputs, to uniquely switch the operation mask information according to the operation level.

However, conventional techniques such as Patent Documents 1 and 2 are unable to appropriately display an annotation depending on the skill level. Also, in the conventional techniques, only one type of skill level is calculated; therefore, even if the skill level is calculated, it has been not possible to analyze factors that hinder productivity improvement.

The present invention has been made in view of the above, and has an object to provide techniques with which an appropriate annotation can be displayed for a user depending on the skill of the user. Also, the present invention has an object to provide techniques for calculating a skill index with which factor analysis can be executed.

Means for Solving the Problem

According to the disclosed techniques, an operational efficiency promoting apparatus that calculates a skill index indicating a skill level related to an operation of a user, based on an operation log of the user on an operation terminal, the operational efficiency promoting apparatus includes a memory; and a processor configured to execute storing the operation log obtained from the operation terminal in the memory; and-calculating the skill index corresponding to each of a plurality of factors based on the operation log read from the memory.

Also, according to the disclosed techniques, an annotation providing apparatus is provided for appending an annotation on a screen displayed on an operation terminal operated by a user, the annotation providing apparatus including: a determination unit configured to determine whether to append an annotation on the screen displayed on the operation terminal, based on a skill index indicating an operational skill level of the user, calculated based on the operation log of the user; and a display unit configured to append the annotation on the screen displayed on the operation terminal.

Advantage of the Invention

According to the disclosed techniques, techniques with which an appropriate annotation can be displayed for a user depending on the skill of the user are provided. Also, according to the disclosed techniques, techniques for calculating a skill index with which factor analysis can be executed are provided.

EMBODIMENTS OF THE INVENTION

In the following, an embodiment according to the present invention (the present embodiment) will be described with reference to the drawings. The embodiment described below is merely an example, and embodiments to which the present invention is applied are not limited to the following embodiment.

(System Configuration)

Figure 1:
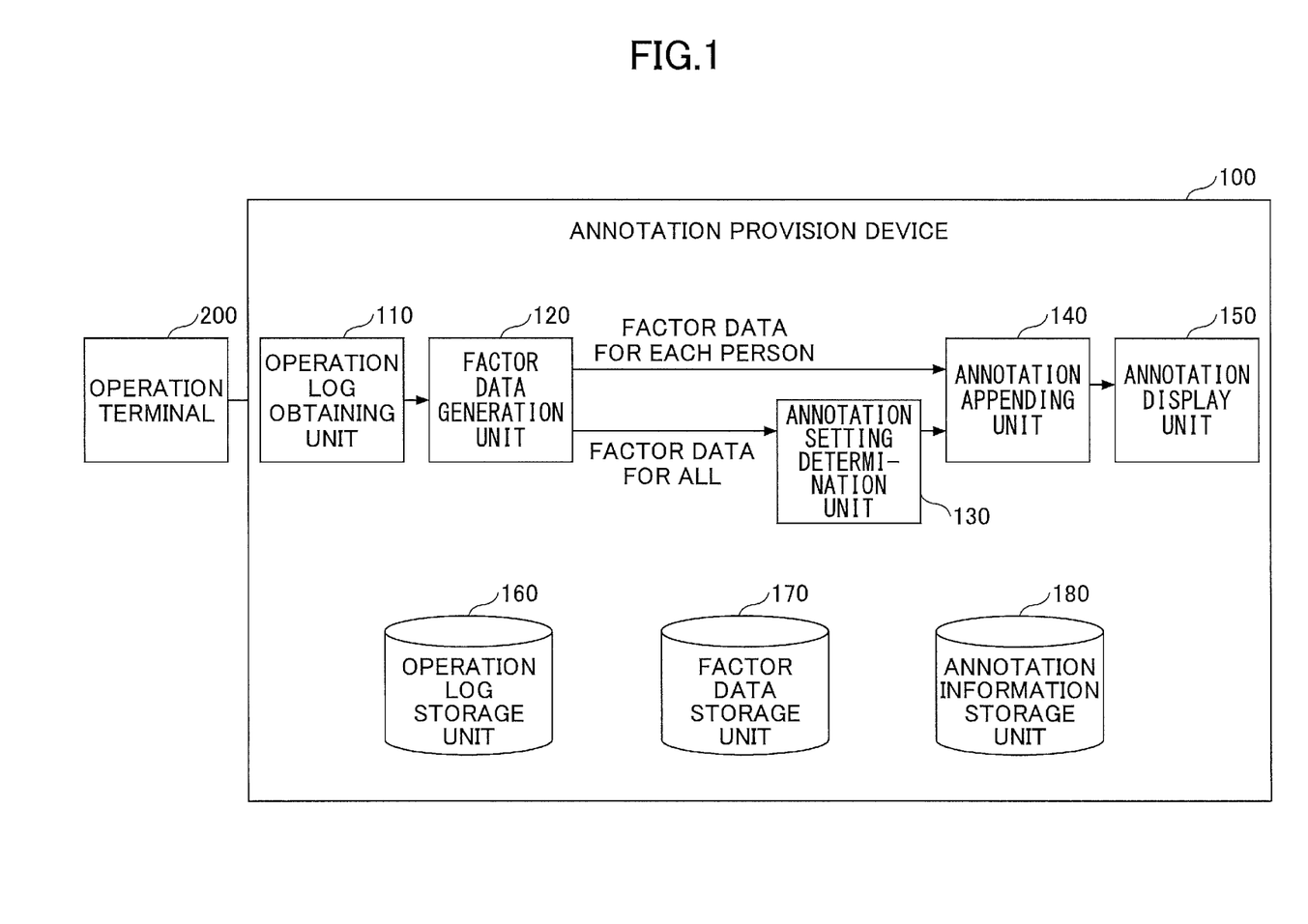
FIG. 1 is a configuration diagram of an annotation providing apparatus in an embodiment according to the present invention.

FIG. 1 illustrates a functional configuration of an annotation providing apparatus 100 in the present embodiment. The annotation providing apparatus 100 in FIG. 1 is a device that is capable of analyzing an operation log of a user obtained from an operation terminal 200 via a network, and appropriately displaying annotations on an interface screen displayed on the operation terminal 200 of the user (including not displaying an annotation if not required). Note that although only one operation terminal 200 is illustrated in FIG. 1, there may be many operation terminals in practice.

As illustrated in FIG. 1, the annotation providing apparatus 100 according to the present embodiment includes an operation log obtaining unit 110, a factor data generation unit 120, an annotation setting determination unit 130, an annotation appending unit 140, an annotation display unit 150, an operation log storage unit 160, a factor data storage unit 170, and an annotation information storage unit 180. Operational contents of the respective functional units will be described with processing steps that will be described later. Note that an item of factor data is also an index indicating the skill level of a user, and may be referred to as a skill index.

Also, a configuration that includes a factor data generation unit 120 and an operation log storage unit 160 may be provided as a single device. In this case, the device may be referred to as a skill index calculation apparatus or an operational efficiency promoting apparatus. In this skill index calculation apparatus, the factor data generation unit 120 calculates and outputs a skill index (factor data) corresponding to each of multiple factors, based on an operation log read from the operation log storage unit 160. Based on the skill indices for the respective factors that have been output, an analysis can be made, for example, as to which factors are the factors that hinder the productivity improvement with respect to the operations.

Also, the device illustrated in FIG. 1 may also be referred to as a skill index calculation apparatus or an operational efficiency promoting apparatus instead of an annotation providing apparatus.

Also, the annotation providing apparatus 100 may be configured to include an annotation setting determination unit 130, an annotation appending unit 140, an annotation display unit 150, a factor data storage unit 170, and an annotation information storage unit 180. In this case, for example, the annotation providing apparatus 100 obtains factor data from a device that includes an operation log obtaining unit 110, an operation log storage unit 160, and a factor data generation unit 120, to execute an annotation appending process using the factor data.

Both the annotation providing apparatus 100 and the skill index calculation apparatus may be implemented on multiple computers, may be implemented on a single computer, or may be implemented on one or more virtual machines on the cloud.

Example of Hardware Configuration

The annotation providing apparatus 100 described above can be implemented by, for example, having a computer execute a program describing processing contents as will be described in the present embodiment.

In other words, the annotation providing apparatus 100 can be implemented by executing a program corresponding to the processing executed by the annotation providing apparatus 100 using hardware resources such as a CPU and a memory built in the computer. The program described above can be recorded on a computer-readable recording medium (portable memory, etc.), to be stored and/or distributed. Also, the program described above can also be provided via a network, such as the Internet or e-mail.

Figure 2:
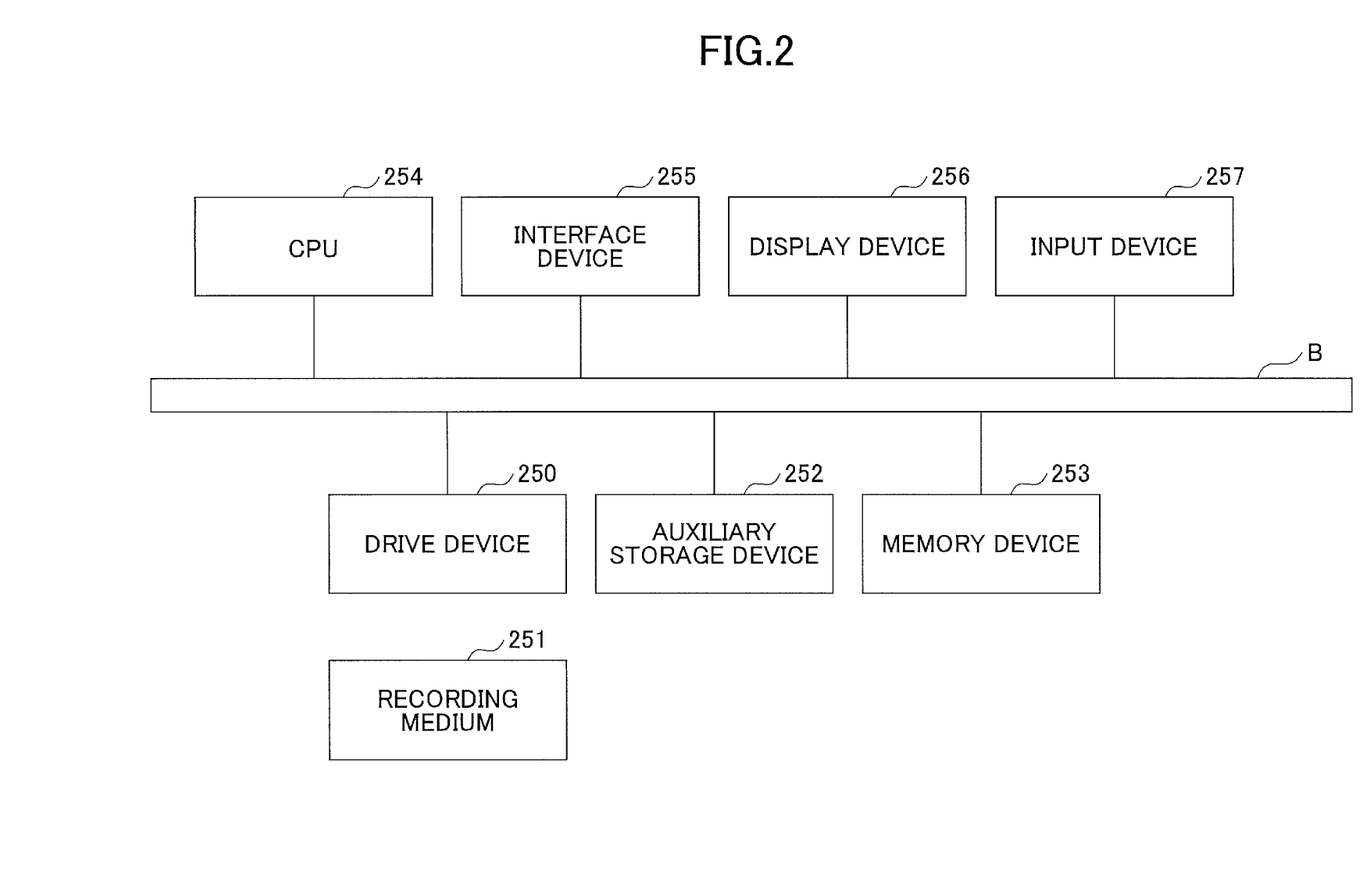
FIG. 2 is a diagram illustrating an example of a hardware configuration of the annotation providing apparatus.

FIG. 2 is a diagram illustrating an example of a hardware configuration of the computer in the present embodiment. The computer in FIG. 2 includes a drive device 250, an auxiliary storage device 252, a memory device 253, a CPU 254, an interface device 255, a display device 256, an input device 257, and the like that are interconnected with a bus B.

A program for implementing processing on the computer is provided with, for example, a recording medium 251, such as a CD-ROM or memory card. When the recording medium 251 in which the program is stored is set in the drive device 250, the program is installed in the auxiliary storage device 252 from the recording medium 251 via the drive device 250. However, installation of the program does not need to be loaded from the recording medium 251, and may be downloaded from another computer via the network. The auxiliary storage device 252 stores the installed program, and also stores necessary files, data, and the like.

The memory device 253 reads and loads the program from the auxiliary storage device 252 when a program start command is received. The CPU 254 implements functions related to the annotation providing apparatus 100, according to the program stored in the memory device 253. The interface device 255 is used as an interface for connecting to a network. The display device 256 displays a GUI (Graphical User Interface) or the like according to the program. The input device 257 is constituted with a keyboard and a mouse, buttons, a touch panel, and the like, to be used for inputting various operating commands.

Note that the skill index calculation apparatus has substantially the same hardware configuration as the annotation providing apparatus 100.

Example of Operations of Annotation Providing Apparatus 100

Figure 3:
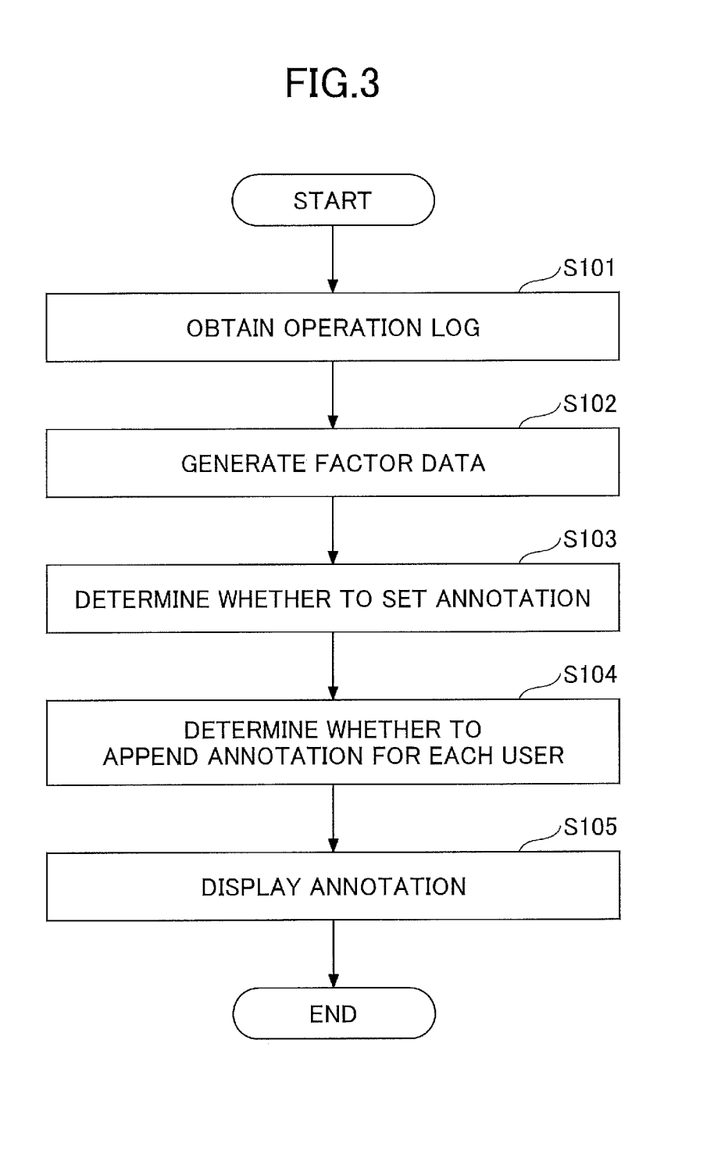
FIG. 3 is a flow chart illustrating processing steps executed by the annotation providing apparatus.

In the following, an example of operations of the annotation providing apparatus 100 will be described with reference to steps illustrated in a flow chart in FIG. 3.

As a prerequisite for the following operations, at the outset, skills of all of multiple users to be provided with annotations by the annotation providing apparatus 100 are regarded as skills of beginners or skills of intermediates (average skills), and the information is stored in a storage unit such as a memory. Alternatively, each user may register his or her skill level. This skill information may be updated sequentially by calculating factor data (=skill index) as will be described below.

<S101: Obtainment of an Operation Log>

At S101, the operation log obtaining unit 110 obtains operation information from the operation terminal 200 on which a web application is operated by a user, and stores the operation information as an operation log in the operation log storage unit 160 as it is or after applying some processing. Examples of the operation information include information on key operations on the keyboard, information on mouse operations, and information on operations on form objects.

It is assumed that the operation log is not left on the operation terminal 200. Also, in order to prevent wiretapping of data during data transfer from the operation terminal 200 to the annotation providing apparatus 100 in which the operation log is to be stored, communication is encrypted.

When obtaining an operation log, for each user, the following specific information items (1) to (11) are calculated for each field, for each screen, and for each order (processing) in a web application, and stored as the operation log in the operation log storage unit 160. Note that the following information items (1) to (11) are merely an example. Also, a field is also referred to as an "item".

The following information may be calculated on the operation terminal 200, and then, obtained by the operation log obtaining unit 110 after the calculation; or the operation log obtaining unit 110 may obtain operation information necessary for the calculation from the operation terminal 200 to execute the calculation.

(1) Interval time

The interval time is calculated as "focus time of the current item−focus off time of the previous item".

(2) Time before input

The time before input is calculated as "initial character input time on the current item−focus time to the current item".

(3) Input time

The input time is calculated as "last character input time on the current item−first character input time on the current item".

(4) Keystroke count

The keystroke count for an item is calculated.

(5) Sophistication of item inputting

The number of times Del key or BS key was pressed is calculated.

(6) Focus count

The number of focuses that have been made (in one process) is recorded.

(7) Questions to the former person in charge (8) Remand and inquiries from the successor (9) Order of inputs (analysis of expertized tendency)

(10) Correlation between input items (mandatory input items) (analysis of expertized tendency)

(11) Trajectories of the mouse

<S102: Generation of Factor Data>

At S102, the factor data generation unit 120 calculates factor data, by extracting information necessary for analysis from operation logs stored in the operation log storage unit 160, and converting and processing the extracted information into an analyzable format. The factor data in the present embodiment is information used for determining whether to set an annotation and for determining to append the annotation for each individual user. Note that the purpose of using factor data is not limited as such, and may be used, for example, for analyzing factors that hinder productivity improvement.

More specifically, the factor data generation unit 120 calculates the following factor data items (1) to (5) for each item and for each user (individual). The calculated factor data is stored in the factor data storage unit 170. Note that the calculation of factor data of types (1) to (5) as the factor data is an example. For example, multiple types of factor data including at least one type of the following factor data may be calculated.

(1) Interval Time (Item, Individual)

A mean of interval times of an individual for an item is calculated. Note that "a mean of interval times of an individual for an item" corresponds to, for example, for an item A and an individual X, if the interval time of the individual X for the item A is obtained multiple times over a certain period of time, the mean of the multiple interval times for the item A and the individual X. The same applies to a value "of an individual for an item" in the following.

(2) Time Before Input (Item, Individual)

A mean of time before inputs of an individual for an item is calculated.

(3) Input Time (Item, Individual)

A mean of (input time of an individual for an item)/(keystroke count) is calculated.

(4) Sophistication of Item Inputting (Item, Individual)

A mean of sophistication of item inputting of an individual for an item.

(5) Error Rate (Item, Individual)

A mean of "(the number of records of an individual focused on an item for two times or more)/(total number of records of the individual for the item)". Note that before generating the factor data, the factor data generation unit 120 executes the following preprocessing for information extracted from the operation log. The following preprocessing is an example.

Exclude outlier data. Outlier data refers to data in which the time is extremely long due to reasons such as inputting operations over one day.

Set the input time of an element whose input time is to be invalidated to 0. An element whose input time is to be invalidated is a field linked with information from another system, a field to be operated on a separate screen opened separately, and the like.

<S103: Determination of Whether to Set an Annotation>

At S103, the annotation setting determination unit 130 determines whether to set an annotation for each item, by using factor data and the like stored in the factor data storage unit 170 for all users. The result of the determination of whether to set an annotation for each item is stored in the annotation information storage unit 180. The details are as follows. In the following, first, information used for the determination will be described in (1), and an example of the method of determining whether the setting is necessary will be described in (2).

(1) Information Used for Determining Whether to Set an Annotation

The annotation setting determination unit 130 calculates a statistic for each factor data (interval time (item), time before input (item), input time (item), sophistication of item inputting (item), and error rate (item)) with respect to each individual and each item, to generate information used for determining whether to set an annotation. Note that the statistic is calculated for each item using a mean of individuals. For example, if factor data for 100 users is obtained for each item and for each factor, the statistic for the 100 users is calculated for each item and for each factor.

The statistics include, for example, means, variances, standard deviations, coefficient of variations (standard deviation/mean), t-test results (p-values) (including test results of the normality of a high-skill group and a normal-skill group), test results of the normality (p-values of Chapirowilk test results), and U-test results (p-values).

(2) Method of Determining to Set an Annotation

In the present embodiment, different annotations are prepared for the respective factors as the types of factor data, and information on the annotations for the respective factors is stored in the annotation information storage unit 180.

For example, for users of high error rates, an annotation to reduce the error rate is provided (e.g., tag information describing points that are likely to be mistaken upon input), and for users of long input times, an annotation to shorten the input time is provided.

Therefore, the annotation setting determination unit 130 executes the determination of whether to set an annotation for each factor of each item. When actually determining to append an annotation for a user for an item that is determined as required to be set with the annotation according to a certain factor (e.g., error rate), the factor (error rate in this example) that served as the criterion for determining to set the annotation is used. A determination to set the annotation for the same item may be determined as required according to multiple factors. In the following, examples of determination to set an annotation (Example 1) to (Example 3) using the above statistics will be described.

Example 1: Determination Based on t-Test Result (p-Value)

As Example 1, a determination based on a t-test result (p-value) will be described. In the determination based on a t-test result (p-value), if the t-test result (p-value) is less than or equal to k (k is a predetermined threshold value that varies depending on the type of factor) for an item and a factor to be determined, the annotation setting determination unit 130 determines that an annotation corresponding to the factor is to be set for the item. When determining to append the annotation of the item for each individual user, the factor is used.

Normality is assumed in the determination based on a t-test result (p-value). Therefore, if the normality is in question, another method of determination needs to be used without executing the determination based on the t-test result (p-value). In order to examine the normality, for example, tests of normality are executed for a high-skill group and on a normal-skill group.

Also, in order to determine whether to use another determination method, first, the distribution of p-values for all items of the factors may be investigated, and if there is no significant difference in the p-values, the t-test result (p-value) may not be used.

Note that as an example, if assuming rejection at a significance level of 5%, at least half of the items need to be rejected. Also, as an example, the rejection rate may be set on an assumption that annotations will be finally appended to approximately 20% of items.

Example 2: Determination Based on Coefficient of Variation

As Example 2, a determination to set an annotation based on the coefficient of variation will be described. In the determination based on the coefficient of variation, if the coefficient of variation is less than or equal to k (k is a predetermined threshold value that depends on the type of factor) for an item and a factor to be determined, the annotation setting determination unit 130 determines that an annotation corresponding to the factor is to be set for the item. When determining to append the annotation of the item for each individual user, the factor is used.

As preparation in advance for the above determination, the distribution of coefficients of variation of all items is investigated for each factor, and for example, the value of k is set assuming that annotations will be appended for approximately 20% of items.

Example 3: Determination Based on Normality Test Result (p-Value)

As Example 3, a determination to set an annotation based on the normality test result (p-value) will be described. In the determination based on the normality test result (p-value), if the normality test result (p-value) is less than or equal to k (k is a predetermined threshold value that depends on the type of factor) for an item and a factor to be determined, the annotation setting determination unit 130 determines that an annotation corresponding to the factor is to be set for the item. When determining to append the annotation of the item for each individual user, the factor is used.

Example 3 is based on the same idea as in Example 1 (t-test result). Note that a goodness-of-fit test for Poisson distribution may be used instead of the normality test. In the case of using the goodness-of-fit test for Poisson distribution, a chi-square test for a Poisson distribution whose parameters are determined to fit is to be executed.

For the determination of whether to set an annotation for each item and for each factor, any one of the determination methods described above may be used; any combination of the methods described above may be used; or the determination may be executed by any method other than the determination methods described above.

(Calculation of Threshold Value)

The annotation setting determination unit 130 calculates a threshold value to be used when determining to append an annotation for each user and for each item or factor determined to be set with the annotation.

For example, the annotation setting determination unit 130 calculates a threshold value as "threshold value=quartile of highly skilled persons (top to 75% point)". This means, for example, that a threshold value for an item A and a factor X is calculated as the quartile of highly skilled persons (skill index) of factor data with respect to the item A and the factor X.

Also, the threshold value may be calculated as "threshold value=mean of the entire group". This means, for example, that a threshold value for an item A and a factor X is calculated as the mean of all users of the factor data for the item A and the factor X.

<S104: Determination of Whether to Append an Annotation for Each User>

As a prerequisite for S104, the annotation information storage unit 180 stores candidates of annotations to be appended. For example, annotations for each factor are statically provided in advance for all input items (fields), and stored in the annotation information storage unit 180.

Also, among the annotations, an annotation whose input rules can be extracted from accumulated operation logs may be generated dynamically. The dynamically generated annotations are also stored in the annotation information storage unit 180. Also, an annotation may be generated from an input field name or an input format (selectable).

At S104, the annotation appending unit 140 determines whether to append an annotation for each item for each individual user, based on the information obtained at S103 (items to be set with annotations and threshold values) and the skill index of the user (factor data for each user), and if it is necessary to append an annotation, the annotation appending unit 140 stores in the annotation information storage unit 180 information indicating that an annotation corresponding to the factor is to be appended to the item, and transmits to the annotation display unit 150 a notice of indicating that the annotation needs to be appended. In the following, the determination of appending will be described in detail.

For an item to be set with an annotation, (1) in the case of the factor data of the user being below the threshold value, the annotation appending unit 140 determines to append an annotation corresponding to the factor data for the user; (2) also, in the case of having monitored in real time input operations on the item by the user, and having detected that the input operations have been time-consuming, the annotation appending unit 140 also determines to append an annotation. In the following, (1) and (2) will be described in more detail. Note that as there may be a case where an annotation is appended without log analysis, the case will be described in (3).

(1) Determination to Append an Annotation in the Case where the Factor Data of the User is Below a Threshold Value The annotation appending unit 140 determines whether to append an annotation for the user every time a screen is displayed for the user. In other words, input results up to the previous operation are used for determining whether to append the annotation for the user. Determination of whether to append the annotation for the item to be determined is executed as in the following steps (S1 to S7). The steps described in S1 to S7 are examples. S2 to S6 do not need to be executed in the following order. Also, the threshold value used in the following is a threshold value calculated at S103.

S1) Factor data items (error rate, sophistication of item inputting, input time, time before input, interval time) of past n times of operations by the user for the item to be determined are obtained from the factor data storage unit 170, the mean in the past n times is calculated for each of the factor data items, and the calculated mean is set as the factor data (skill index) of the user to be used in the following steps. In each of the following steps S2 to S6, if it is determined to append an annotation, the process is terminated upon the determination.

S2) The factor data (error rate) of the user is compared with the threshold value for the error rate of the item to be determined, and if the factor data (error rate) of the user is higher than the threshold value, it is determined to append the annotation corresponding to the error rate.

S3) The factor data (sophistication of item inputting) of the user is compared with the threshold value for the sophistication of item inputting of the item to be determined, and if the factor data (sophistication of item inputting) of the user is lower than the threshold value, it is determined to append the annotation corresponding to the sophistication of item inputting.

S4) The factor data (input time) of the user is compared with the threshold value for the input time of the item to be determined, and if the factor data (input time) of the user is longer than the threshold value, it is determined to append the annotation corresponding to the input time.

S5) The factor data (time before input) of the user is compared with the threshold value for the time before input of the item to be determined, and if the factor data (time before input) of the user is longer than the threshold value, it is determined to append the annotation corresponding to the time before input.

S6) The factor data (interval time) of the user is compared with the threshold value for the interval time of the item to be determined, and if the factor data (interval time) of the user is longer than the threshold value, it is determined to append the annotation corresponding to the interval time.

S7) If the factor data of the user is above the threshold value for all factors, it is determined not to append the annotation for the item to be determined.

In the above steps, for each item (input field), the factor data of the user is compared with the threshold value for each and every factor, and if any one of the factors satisfies the condition of appending an annotation, the annotation is appended.

However, this is an example. As another method, all of the determinations of S2 to S6 may be executed, and if there are multiple factors that satisfy the conditions of appending an annotation, whether to append the annotation may be determined by comprehensively assigning weights for the multiple factors.

Also, as a method of determining to append an annotation using the skill level of the user (i.e., the factor data of the user), annotations may be appended for all items in advance, and depending on the skill level of the user who is expected to make improvements as the number of operations increases, appended annotations for highly skilled items may be removed.

Note that appending annotations to all items in advance and removing annotations for highly skilled items correspond to another example of appending annotations based on the skill level.

(2) Determination to Append an Annotation in the Case where Input Operations have been Time-Consuming Even if a determination is made at S7 not to append the annotation, the annotation appending unit 140 monitors in real time whether any of the following cases (cases 1 to 4) occurs by receiving information obtained by the operation log obtaining unit 110, and if detecting an occurrence, appends an annotation in real time.

Case 1: case of the interval time exceeding m (where m is set for each item).

Case 2: case of the time before input exceeding k (where k is set for each item).

Case 3: case of the input time exceeding l (where l is set for each item).

Case 4: case of the mouse movement distance exceeding n (where n is set in advance).

(3) Example of Appending an Annotation without Log Analysis

As in the case of annotating a mandatory item or in the case of annotating the order of inputs, in the case where it is known in advance that an annotation will be appended, the annotation appending unit 140 may append an annotation by a predetermined method without analyzing an operation log. Information representing the predetermined method is stored in advance in the annotation information storage unit 180.

In the case of annotating a mandatory item, for example, the following annotation methods are available.

Display the mandatory item.

Display items requiring no inputs in greyed-out fields.

Conditions of mandatory items and items requiring no inputs are registered in an external table so as to be changeable.

Change mandatory items and items requiring no inputs according to the state transition of input items.

Also, in the case of annotating the order of inputs, for example, the following method is available.

Annotate the order of inputs (next item to be input).

Skip items requiring no inputs.

If the cursor is moved, restart the annotation on an item at the moved point.

<S105: Display of Annotation>

At S105, the annotation display unit 150 displays an annotation on the operation terminal 200 of the user, by using information stored in the annotation information storage unit 180 (information obtained at S104). For example, based on the operation logs obtained by the operation log obtaining unit 110, once an operation is detected for a certain item, and the annotation appending unit 140 determines to append an annotation for the user for the item, the information (user, item, factor, contents of the annotation, etc.) is stored in the annotation information storage unit 180, and a notice of the necessity of appending the annotation is transmitted to the annotation display unit 150. Then, by reading the annotation information from the annotation information storage unit 180, the annotation display unit 150 displays the annotation on the item on the screen displayed on the operation terminal 200 of the user.

The annotation display unit 150 displays the annotation on the screen displayed by the operation terminal 200, in a way not to change the source code on the front end side of existing systems such as web applications, and not to interfere with the user operations.

As a presentation method of an annotation executed by the annotation display unit 150, for example, tag indication (including background color setting), icon display (including font color/icon settings, and display timing settings), crossover display, blinking display, highlighted or framed display of a mandatory item yet to be input, and the like are available; however, these are examples and other presentation methods may be used to display annotations.

Effects and the Like of the Embodiment

In the present embodiment, factor data as information to be used when determining whether to append an annotation from operation logs of a user (corresponding to the skill index) is calculated; for each factor data item, whether to append an annotation is determined; and an annotation is displayed based on the criteria for appending the annotation; therefore, the annotation can be displayed appropriately in accordance with the skill level.

By appending annotations, the productivity can be improved, the learning period can be shortened, and the learning cost can be reduced; and also, users can be evaluated individually (learning level evaluation). Also, by calculating the factor data (skill index) for each of the multiple factors, individual users and an organization can be evaluated (evaluations of the learning level and the learning speed), and further, factors that inhibit productivity gains can be analyzed (identifying a factor among factors including the skills of operators, a system (UI) configuration, and a work procedure).

SUMMARY OF THE EMBODIMENT

The present specification describes at least the following matters.
(Matter 1)
An annotation providing apparatus for appending an annotation on a screen displayed on an operation terminal operated by a user, the annotation providing apparatus comprising:
a calculation unit configured to calculate a skill index indicating a skill level related to an operation of the user based on an operation log obtained from the operation terminal;
a determination unit configured to determine whether to append an annotation on the screen displayed on the operation terminal, based on the skill index; and
a display unit configured to append the annotation on the screen displayed on the operation terminal.
Note that the factor data generation unit 120 described in the embodiment is an example of the calculation unit described above; the annotation setting determination unit 130 and the annotation appending unit 140 are examples of the determination unit described above; and the annotation display unit 150 is an example of the display unit described above.
(Matter 2)
The annotation providing apparatus as described in matter 1, wherein the calculation unit calculates a threshold value from skill indices with respect to a plurality of users, and
wherein the determination unit determines whether to append the annotation by comparing the skill index of the user to be determined with the threshold value.
(Matter 3)
The annotation providing apparatus as described in matter 1 or 2, wherein the calculation unit calculates a statistic of the skill indices of the plurality of users for each item displayed on the screen, and
wherein the determination unit determines whether to set the annotation for said each item based on the statistic, to determine whether to append the annotation for the user for an item determined to be set with the annotation.
(Matter 4)
The annotation providing apparatus as described in any one of matters 1 to 3, wherein the calculation unit calculates skill indices corresponding to a plurality of factors, respectively, and
wherein the determination unit determines whether to append an annotation corresponding to said each of the plurality of factors, based on the skill indices corresponding to the plurality of factors.
(Matter 5)
The annotation providing apparatus as described in matter 4, wherein the skill indices corresponding to the plurality of factors include any one of interval time, time before input, input time, sophistication of item inputting, and error rate.
(Matter 6)
An annotation providing method executed by an annotation providing apparatus for appending an annotation on a screen displayed on an operation terminal operated by a user, the annotation providing method comprising:
a calculation step of calculating a skill index indicating a skill level related to an operation of the user based on an operation log obtained from the operation terminal;
a determination step of determining whether to append an annotation on the screen displayed on the operation terminal, based on the skill index; and
a display step of appending the annotation on the screen displayed on the operation terminal.
(Matter 7)
A program for causing a computer to function as the respective units in the annotation providing apparatus described in any one of matters 1 to 5.
(Matter 8)
A skill index calculation apparatus that calculates a skill index indicating a skill level related to an operation of a user, based on an operation log of the user on an operation terminal, the skill index calculation apparatus comprising:
a storage unit configured to store the operation log obtained from the operation terminal; and
a calculation unit configured to calculate the skill index corresponding to each of a plurality of factors based on the operation log read from the storage unit.
(Matter 9)
The skill index calculation apparatus device as described in matter 8, wherein skill indices corresponding to the plurality of factors include at least one of interval time, time before input, input time, sophistication of item inputting, and error rate.

(Matter 10)

An annotation providing apparatus for appending an annotation on a screen displayed on an operation terminal operated by a user, the annotation providing apparatus comprising:

a determination unit configured to determine whether to append an annotation on the screen displayed on the operation terminal, based on a skill index indicating an operational skill level of the user, calculated based on the operation log of the user; and a display unit configured to append the annotation on the screen displayed on the operation terminal.

(Matter 11)

The annotation providing apparatus as described in matter 10, wherein the determination unit determines whether to append the annotation, by comparing the skill index of the user to be determined with a threshold value calculated from skill indices of a plurality of users.

(Matter 12)

A skill index calculation method executed by a skill index calculation apparatus that calculates a skill index indicating a skill level related to an operation of a user, based on an operation log of the user on an operation terminal, the skill index calculation method comprising:

a calculation step of calculating the skill index corresponding to each of a plurality of factors based on the operation log read from a storage unit configured to store the operation log obtained from the operation terminal.

(Matter 13)

An annotation providing method executed by an annotation providing apparatus for appending an annotation on a screen displayed on an operation terminal operated by a user, the annotation providing method comprising:

a determination step of determining whether to append an annotation on the screen displayed on the operation terminal, based on a skill index indicating an operational skill level of the user, calculated based on the operation log of the user; and a display step of appending the annotation on the screen displayed on the operation terminal.

(Matter 14)

A program for causing a computer to function as the respective units in the skill index calculation apparatus as described in matter 8 or 9.

(Matter 15)

A program for causing a computer to function as the respective units in the annotation providing apparatus as described in matter 10 or 11.

As described above, the present embodiment has been described; note that the present invention is not limited to such a specific embodiment, and various modifications and changes can be made within the scope of the subject matters of the present invention as described in the claims.

The present patent application claims priority to Japanese Patent Application No. 2018-200331, filed on Oct. 24, 2018, and the entire contents of Japanese Patent Application No. 2018-200331 are hereby incorporated by reference.

LIST OF REFERENCE SYMBOLS 100 annotation providing apparatus
110 operation log obtaining unit
120 factor data generation unit
130 annotation setting determination unit
140 annotation appending unit
150 annotation display unit
160 operation log storage unit
170 factor data storage unit
180 annotation information storage unit
200 operation terminal
250 drive device
251 recording medium
252 auxiliary storage device
253 memory device
254 CPU
255 interface device
256 display device
257 input devices

The invention claimed is:

1. An operational efficiency promoting apparatus, based on an operation log of an operator on an operation terminal, the operational efficiency promoting apparatus comprising:
a memory; and
a processor configured to execute a method comprising:
storing the operation log associated with the operator operating an operation terminal, wherein the operation log records a history of the operator operating the operation terminal;
determining, based on the operation log and a predetermined factor, a skill index associated with the operator, wherein the skill index represents a data value of the predetermined factor associated with one or more annotations to content of a display, wherein the one or more annotations help reduce an error in operations by the operator, wherein the predetermined factor identifies an aspect that inhibits productivity gain associated with operating the operation terminal, and wherein the predetermined factor at least in part indicates whether to interactively display the one or more annotations to the operator;
determining, based on the skill index indicating a skill level related to the operating by the operator, whether to append an annotation associated with an item on a screen displayed on the operation terminal for one or more of a plurality of factors, wherein, when having detected that an input operation on the item has been time-consuming for the operator while monitoring in real time input operation by the operator, the determining further comprises causing to append the annotation; and
displaying the annotation to the content of the display, wherein the annotation includes an indication displayed on or at a location substantially in proximity to the item as a next item to enter input on the screen without interfering with the operator operating the operation terminal.

2. The operational efficiency promoting apparatus in claim 1, wherein the skill index includes at least one of:
an interval time,
a time before input,
an input time,
sophistication of item inputting, or
an error rate.

3. The operational efficiency promoting apparatus in claim 1, wherein the processor is further configured to execute a method comprising:
determining whether to append the annotation on the screen displayed on the operation terminal, based on the skill index indicating the skill level related to operations by the operator, for the predetermined factor; and appending the annotation on the screen displayed on the operation terminal.

4. The operational efficiency promoting apparatus in claim 3, wherein the determining whether to append the annotation determines whether to append the annotation for the predetermined factor, by comparing the skill index of the operator to be determined with a threshold value calculated based on a statistic using skill indices of a plurality of operators.

5. The operational efficiency promoting apparatus in claim 1, wherein the operation log is at least one of:
an interval time to shift to a current item,
a time after the current item is focused until an initial character is input,
a time elapsed during inputting on the current item,
a keystroke count for the current item, a number of times a Del key or a BS key is pressed,
a focus count on the current item, questions to a former person in charge,
remand and inquiries from a successor, order of inputs, correlation between input items, or
trajectories of a mouse.

6. The operational efficiency promoting apparatus in claim 1,
wherein whether to append the annotation for each of the plurality of factors is determined by comparing the skill index of the operator to be determined with a threshold value calculated based on a statistic using skill indices with respect to a plurality of operators, and even if it is determined not to append the annotation, in a case where a phenomenon that indicates the input operation is time-consuming for the operator is detected, it is determined to append the annotation in real time.

7. The operational efficiency promoting apparatus in claim 6,
wherein the phenomenon that indicates the input operation is time-consuming for the operator includes an interval time exceeding a predetermined interval time value, a time before input exceeding a predetermined time before input value, an input time exceeding a predetermined input time value, and a mouse movement distance exceeding a predetermined mouse movement distance value.

8. A computer-implemented method for promoting an operational efficiency, the method comprising:
determining, based on an operation log and a predetermined factor, a skill index associated with an operator, wherein the skill index represents a data value of the predetermined factor associated with one or more annotations to content of a display, wherein the one or more annotations help reduce an error in operations by the operator, wherein the predetermined factor identifies an aspect that inhibits productivity gain associated with operating the operation terminal, and wherein the predetermined factor at least in part indicates whether to interactively display the one or more annotations to the operator,
wherein the skill index corresponds to at least a part of a plurality of predetermined factors based on the operation log read from a memory configured to store the operation log obtained from an operation terminal;
determining, based on the skill index indicating a skill level related to the operating by the operator, whether to append an annotation associated with an item on a screen displayed on the operation terminal for one or more of a plurality of factors, wherein, when having detected that an input operation on the item has been time-consuming for the operator while monitoring in real time input operation by the operator, the determining further comprises causing to append the annotation; and
displaying the annotation to the content of the display, wherein the annotation includes an indication displayed on or at a location substantially in proximity to the item as a next item to enter input on the screen without interfering with the operator operating the operation terminal.

9. The computer-implemented method in claim 8, the method further comprising:
determining whether to append the annotation on the screen displayed on the operation terminal, based on the skill index indicating the skill level corresponding to the at least the part of the plurality of predetermined factors; and
appending the annotation on the screen displayed on the operation terminal.

10. The computer-implemented method in claim 8,
wherein whether to append the annotation for each of the plurality of factors is determined by comparing the skill index of the operator to be determined with a threshold value calculated based on a statistic using skill indices with respect to a plurality of operators, and even if it is determined not to append the annotation, in a case where a phenomenon that indicates the input operation is time-consuming for the operator is detected, it is determined to append the annotation in real time.

11. The computer-implemented method in claim 10,
wherein the phenomenon that indicates the input operation is time-consuming for the operator includes an interval time exceeding a predetermined interval time value, a time before input exceeding a predetermined time before input value, an input time exceeding a predetermined input time value, and a mouse movement distance exceeding a predetermined mouse movement distance value.

12. A non-transitory computer-readable recording medium having computer-readable instructions stored thereon, which when executed, causes a computer to execute a method comprising:
storing an operation log associated with an operator operating an operation terminal, wherein the operation log records a history of the operator operating the operation terminal;
determining, based on the operation log and a predetermined factor, a skill index associated with the operator, wherein the skill index represents a data value of the predetermined factor associated with one or more annotations to content of a display, wherein the one or more annotations help reduce an error in operations by the operator according to the predetermined factor, wherein the predetermined factor identifies an aspect that inhibits productivity gain associated with operating the operation terminal, and wherein the predetermined factor at least in part indicates whether to interactively display the one or more annotations to the operator;
determining, based on the skill index indicating a skill level related to the operating by the operator, whether to append an annotation associated with an item on a screen displayed on the operation terminal for one or more of a plurality of factors, wherein, when having detected that an input operation on the item has been time-consuming for the operator while monitoring in real time input operation by the operator, the determining further comprises causing to append the annotation; and displaying the annotation to the content of the display, wherein the annotation includes an indication displayed on or at a location substantially in proximity to the item as a next item to enter input on the screen without interfering with the operator operating the operation terminal.

13. The non-transitory computer-readable recording medium in claim 12, wherein whether to append the annotation for each of the plurality of factors is determined by comparing the skill index of the operator to be determined with a threshold value calculated based on a statistic using skill indices with respect to a plurality of operators, and even if it is determined not to append the annotation, in a case where a phenomenon that indicates the input operation is time-consuming for the operator is detected, it is determined to append the annotation in real time.

14. The non-transitory computer-readable recording medium in claim 13, wherein the phenomenon that indicates the input operation is time-consuming for the operator includes an interval time exceeding a predetermined interval time value, a time before input exceeding a predetermined time before input value, an input time exceeding a predetermined input time value, and a mouse movement distance exceeding a predetermined mouse movement distance value.

* * * * *